United States Patent [19]

Shibata et al.

[11] Patent Number: 4,533,961
[45] Date of Patent: Aug. 6, 1985

[54] MAGNETIC RECORDING APPARATUS WITH LEVEL ADJUSTING MEANS FOR MIXED LUMINANCE, CHROMINANCE, AUDIO AND PILOT SIGNALS

[75] Inventors: Akira Shibata; Isao Wada; Atsushi Yoshioka, all of Katsuta, Japan

[73] Assignee: Hitachi, Ltd., Tokyo, Japan

[21] Appl. No.: 481,252

[22] Filed: Apr. 1, 1983

[30] Foreign Application Priority Data

Apr. 2, 1982 [JP] Japan .................................. 57-53819
Jul. 7, 1982 [JP] Japan ................................ 57-116790

[51] Int. Cl.$^3$ ..................... H04N 9/491; H04N 9/493
[52] U.S. Cl. .................................. 358/315; 358/310; 360/19.1
[58] Field of Search ............... 358/310, 315, 316, 318, 358/27, 30, 330

[56] References Cited

U.S. PATENT DOCUMENTS 3,968,513  7/1976  de Haan ............................. 358/323
4,208,671  6/1980  Ozawa et al. ..................... 358/330

Primary Examiner—Raymond F. Cardillo, Jr.
Assistant Examiner—Alan K. Aldous
Attorney, Agent, or Firm—Antonelli, Terry & Wands

[57] ABSTRACT

In a magnetic recording apparatus for frequency multiplexing and recording a frequency-modulated luminance signal, a chrominance signal, a frequency-modulated audio signal and a pilot signal on a magnetic tape, the signal level of the frequency-modulated luminance signal is adjusted by a first signal level adjuster, and the chrominance signal, the pilot signal and the frequency-modulated audio signal are mixed and then subjected to signal level adjustment by a second signal level adjuster. The signal levels of the four signals can be adjusted by the two level adjusters.

3 Claims, 14 Drawing Figures

MAGNETIC RECORDING APPARATUS WITH LEVEL ADJUSTING MEANS FOR MIXED LUMINANCE, CHROMINANCE, AUDIO AND PILOT SIGNALS

The present invention relates to a magnetic recording apparatus for recording video signals on a magnetic tape and more particularly to a signal write circuit for a magnetic recording apparatus which records a video signal, an audio signal and a pilot signal on a video track in a multiplexed manner.

To record the video signal in a color television signal on a magnetic tape, it has been the usual practice so that the luminance signal and the chrominance signal are separated from the video signal, that the carrier signal is frequency modulated with the luminance signal to produce a frequency-modulated luminance signal, that the frequency of the color subcarrier signal of the chrominance signal is converted to a frequency in a frequency band lower than the frequency band of the lower side band signal of the luminance signal, and that the frequency-modulated luminance signal and the lower-frequency-converted chrominance signal are mixed, frequency multiplexed and then recorded on the magnetic tape by the rotary video heads.

Where the frequency-modulated luminance signal and the chrominance signal frequency converted to a lower frequency are to be frequency multiplexed and recorded, the chrominance signal utilizes the luminance signal as a bias current to effect the recording. The luminance signal is not biased but adjusted up to a signal level which saturates the magnetic tape and the chrominance signal is adjusted to such a low signal level which does not interfere with the luminance signal thereby effecting the recording. The signal levels of the luminance signal and the chrominance signal are adjusted to meet the requirements of video heads having different characteristics since the optimum recording current values of the respective signals differ for different video heads.

An attempt has been made in which in addition to the luminance signal and the chrominance signal, four pilot signals for detecting a tracking error between the video heads and the video track of a magnetic tape and the frequency-modulated audio signal are frequency multiplexed and recorded on the video track. This type of magnetic recording apparatus is designed so that the frequency-modulated audio signal is arranged in the frequency band between the lower side band signal of the luminance signal and the upper side band signal of the chrominance signal and the four pilot signals of different frequencies are arranged in a frequency band lower than the frequency band of the lower side band signal of the chrominance signal thereby recording these signals on the video track by the rotary video heads. The audio signal and the pilot signals must each be adjusted to the proper signal level for recording the same. In other words, if the signal level of the recorded audio signal is high, the amount of crosstalk of the audio signal to the frequency bands of the luminance signal and the chrominance signal is increased and this interferes with the luminance signal and the chrominance signal upon playback. Contrary, if the signal level of the recorded audio signal is low, the quality of the audio signal is degraded. The same applies to the pilot signals. As a result, the audio signal processing circuit for processing the audio signal must be provided with a level adjuster for adjusting the signal level and the pilot signal processing circuit for processing the pilot signals must also be provided with a level adjuster.

If the signal level of each of a plurality of signals to be recorded is adjusted separately, this is advantageous for using magnetic tapes having different characteristics. In other words, the recording of signals requires that the signal level of each signal must be set to the optimum level in accordance with the frequency characteristic of the magnetic tape used and the proper adjustment of the signal level of the plurality of signals makes it possible to record them with the best signal level conditions. However, an increase in the number of adjusters for signal level adjusting purposes increases the number of adjusting operations during the manufacture of magnetic recording apparatus with the resulting deterioration of the productivity.

It is therefore the primary object of the present invention to provide a magnetic recording appararatus capable of adjusting the signal level of each of a plurality of signals to be recorded to the optimum recording level without any increase in the number of adjusters for signal level adjusting purposes.

In accordance with the present invention there is thus provided a magnetic recording apparatus in which a plurality of signals to be recorded in a frequency band lower than the frequency band of the lower side band signal of a luminance signal, e.g., a lower-frequency-converted chrominance signal, a frequency-modulated audio signal and a pilot signal are mixed and the signal levels of the plurality of signals are adjusted by a single level adjuster thereby recording the signals on a magnetic tape under the optimum conditions.

The invention will become readily apparent from the following description taken in conjunction with the accompanying drawings, in which.

Figure 1:
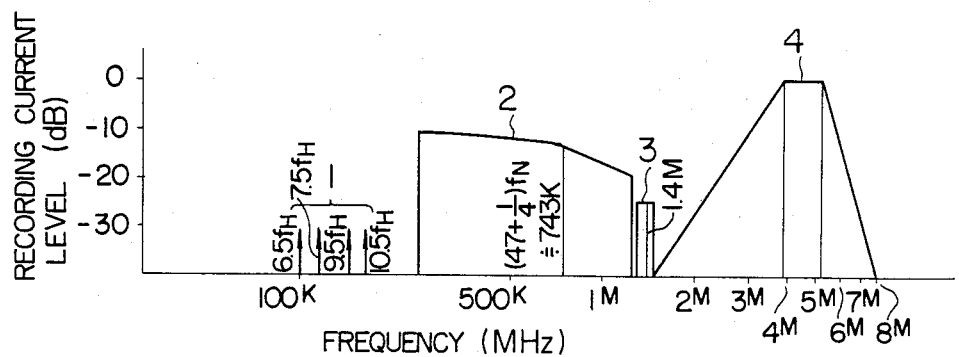
FIG. 1 is a frequency spectrum of signals which are recorded by a magnetic recording apparatus according to the invention.

The magnetic recording apparatus according to the invention will now be described with reference to the illustrated embodiment. FIG. 1 shows the spectrum of signals which are recorded on the video track of a magnetic tape by the magnetic recording apparatus of this invention and numeral 4 designates a modulated luminance signal (hereinafter referred to as an FM luminance signal) produced by frequency modulating a carrier signal. The FM luminance signal is one produced by frequency modulating the carrier signal having a center frequency of 4.55 MHz with the luminance signal and the frequency divisions of the carrier signal are selected between 3.9 MHz and 5.2 MHz. Since the luminance signal is frequency modulated and recorded in. this way, its amplitude is constant and therefore it is recorded with a signal level which is sufficiently high to saturate the magnetic tape.

In the case of the NTSC system, as shown at numeral 2, a chrominance signal frequency converted to a lower frequency has a carrier frequency of $(47+\frac{1}{4})f_H \approx 743$ kHz (where $f_H$ is the horizontal scanning frequency) thereby emphasizing the lower sideband and slightly suppressing the upper sideband.

Numeral 3 designates a frequency-modulated audio signal (hereinafter referred to as an FM audio signal) has a carrier frequency selected to be 1.4 MHz and it is frequency multiplexed between the FM luminance signal 4 and the lower-frequency-converted chrominance signal 2.

Numeral 1 designates tracking pilot signals including four carriers. Their frequencies are about 6.5 $f_H \approx 103$ kHz, 7.5 $f_H = 119$ kHz, 9.5 $f_H = 149$ kHz and 10.5 $f_H = 165$ kHz.

Next, the recording levels of these signals will be explained. If the current level of the FM luminance signal 4 is 0 dB, then $-25$ dB is the optimum value for the current level of the FM audio signal 3. An increase in the recording level of the FM audio signal 3 increases the amount of interference with the FM luminance signal 4 and the lower-frequency-converted chrominance signal 2. On the other hand, a decrease in the level of the FM audio signal 3 degrades the reproduced sound quality.

The optimum recording current of the lower-frequency-converted chrominance signal is about $-14$ dB. If the recording level is increased, a beat will be produced in the FM luminance signal 4, and the S/N ratio of the chrominance signal will be degraded if the recording level is decreased.

The tracking controlling pilot signals 1 record carriers on the video tracks, one on each track, and the four carrier of different frequencies are sequentially recorded repeatedly. If the recording level of the pilot signal is increased, while the S/N ratio of the reproduced pilot signal is improved and the tracking control characteristic is improved, also the amount of interference with the chrominance signal and the FM luminance signal is increased. On the contrary, a decrease in the recording level of the pilot signal reduces the amount of intereference but it also deteriorates the tracking control characteristic.

Figure 2:
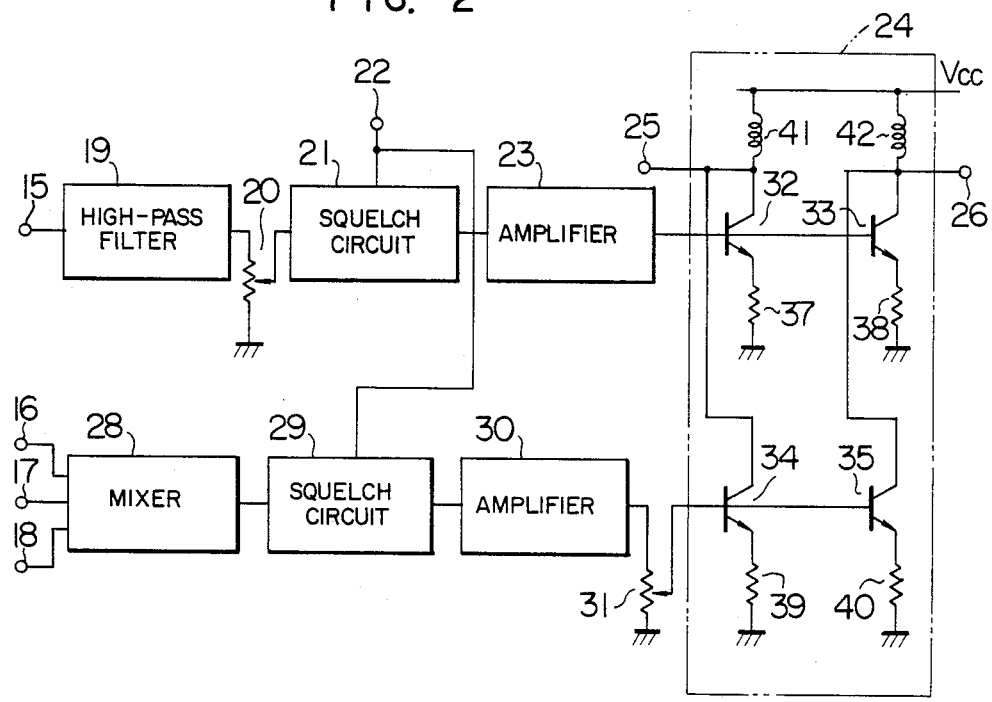
FIG. 2 is a block diagram showing an embodiment of the magnetic recording apparatus according to the invention.

FIG. 2 is a block diagram showing an embodiment of a magnetic recording apparatus for recording the abovedescribed FM luminance signal, chrominance signal and pilot signals on a magnetic tape. The FM luminance signal is supplied to an input terminal 15 and then the FM luminance signal is supplied to a high-pass filter 19. The high-pass filter 19 eliminates the higher side-band components present in a frequency band lower than the frequency band of the lower side band signal of the FM luminance signal. A first level adjuster 20 is connected to the output terminal of the high-pass filter 19 so that the FM luminance signal passed through the high-pass filter 19 is adjusted to the optimum level by the first level adjuster 20. The level-adjusted FM luminance signal is supplied to the input terminal of a first squelch circuit 21. The first squelch circuit 21 cuts off the FM luminance signal such that the recording current is prevented from flowing to the magnetic heads until the magnetic heads are brought into intimate contact with the magnetic tape at the start of the recording and the first squelch circuit 21 is controlled by a control signal supplied to a control terminal 22 at the start of recording and the end of recording, respectively, to cut off the FM luminance signal. On the other hand, during the time that the magnetic heads are intimate contact with the magnetic tape the first squelch circuit 21 passes and supplies the FM luminance signal to an amplifier 23. The FM luminance signal supplied to the input terminal of the amplifier 23 is amplified and supplied to an output amplifier 24.

The frequency-converted chrominance signal is supplied to an input terminal 16 and the FM audio signal is supplied to an input terminal 17. Also, the pilot signals are supplied to an input terminal 18 sequentially at the rate of one per field. The chrominance signal, the FM audio signal and the pilot signal applied to the input terminals 16, 17 and 18, respectively, are supplied to a mixer 28 where the signals are mixed and frequency multiplexed. The output signal from the mixer 28 is supplied to a second squelch circuit 29 and then applied to an amplifier 30 through the second squelch circuit 29. Thus, the chrominance signal, the FM audio signal and the pilot signal are amplified by the amplifier 30 and then supplied to the output amplifier 24 through a level adjuster 31. The output amplifier 24 includes four output transistors 32, 33, 34 and 35 which operate as class-A amplifiers, and the first transistor 32 is a common-emitter amplifier having its emitter grounded through an emitter resistor 37 and its collector connected to a power supply Vcc through an inductance 41 operating as a load and to a first output terminal 25. The second transistor 33 has its emitter grounded through an emitter resistor 38 and its collector connected to the power supply Vcc through an inductance 42 operating as a load and also to a second output terminal 26. Each of the first and second transistors 32 and 33 has its base connected to the output terminal of the amplifier 23 so that the luminance signal supplied from the amplifier 23 is amplified and delivered to the first output terminal 25 or the second output terminal 26. The third transistor 34 has its emitter grounded through an emitter resistor 39 and its collector connected to the first output terminal 25. The inductance 41 serves as the load of the third transistor 34. The fourth transistor 35 has its emitter grounded through an emitter resistor 40 and its collector connected to the second output terminal 26. Its load is the inductance 42. Each of the third and fourth transistors 34 and 35 has its base connected to the level adjuster 31 so as to amplify the composite signal including the chrominance signal, the FM signal and the pilot signal which are adjusted in level by the level adjuster 31. The inductance 41 serves as the load common to the first and third transistors 32 and 34. Thus, the FM luminance signal amplified by the first transistor 32 is mixed and frequency multiplexed with the composite signal amplified by the third transistor 34. Similarly the inductance 42 serves as the common load to the second and fourth transistors 33 and 35 and the outputs of the two transistors are mixed. The first output terminal 25 is connected to the first video head and the second output terminal 26 is connected to the second video head, thereby alternately selecting the video heads and recording the signals on the magnetic tape.

In the above-described apparatus, the chrominance signal, the FM audio signal and the pilot signal supplied to the input terminals 16, 17 and 18, respectively, are combined by the mixer 28 and then the signal levels are adjusted by the level adjuster 31.

The level adjusters for adjusting the recording current levels are necessary for the following reasons. Where a large number of video heads are made, the core material, gap length, etc., are not uniform and thus there result variations in inductance value and biased recording characteristic among the video heads. The level adjusters 20 and 31 are provided to supply to the video heads the optimum recording currents to compensate for the variations in inductance. The variations in biased recording characteristic include, for example, the fact that an increase in the gap length causes an increase in the reproduction level of the signals recorded by the biased recording. On the other hand, a decrease in the gap length causes a decrease in the reproduction level of the signals recorded by the biased recording. As a result, the biased recording and reproducing characteristics of the video head units are measured preliminarily so that the video head units which are uniform in characteristics are selected and ranked into those which are high in reproduction level and others low in reproduction level.

Thus, the recording level is increased for the video heads which are low in reproduction level and the recording level is decreased for the video heads high in reproduction level. The level adjusters 20 and 31 are provided for this purpose. Here, what is to be mentioned specially is the fact that each of the FM audio signal, the chrominance signal and the pilot signals uses the FM luminance signal as a bias signal and is recorded by the biased recording.

As a result, the variations in reproduction level of the pilot signals, the chrominance signal and the FM audio signal due to the variations in characteristics of the video heads are caused in association with the nonuniformity in characteristics among the video heads.

Therefore, the level adjuster 31 for absorbing these variations should preferably be arranged on the output side of the mixer 28 for mixing the three signals.

Since the chrominance signal, the FM audio signal and the pilot signals use the luminance signal as their bias signal and are subjected to the biased recording, so far as the recording is effected by saturating the luminance signal, even if the video heads differ in frequency characteristic from each other, the relative values of the three signal levels of the chrominance signal, the FM audio signal and the pilot signal are not changed so far as the relative values of the signals applied to the input terminals 16 to 18 remain constant. Thus, it is only necessary to adjust the signal recording currents at two points so that if the luminance signal is adjusted singly by the level adjuster 20, the other three signals may be adjusted collectively by the level adjuster 31 after their mixing. This has the effect of simplifying the adjustment of the signal levels.

Figure 3:
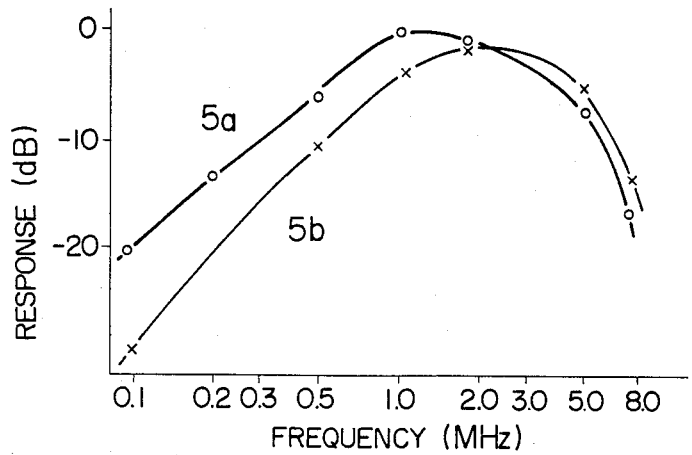
FIG. 3 is a diagram showing reproducing frequency characteristics of an alloy powder magnetic tape and a deposited alloy magnetic tape.
Figure 4:
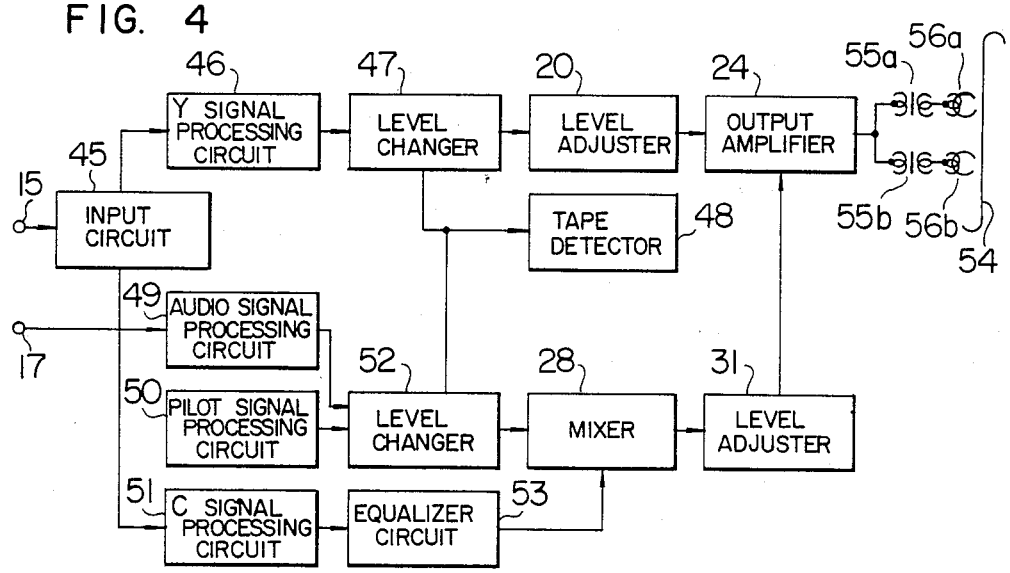
FIG. 4 is a block diagram showing another embodiment of the magnetic recording apparatus according to the invention.

FIG. 3 shows the reproducing frequency characteristics of a magnetic tape produced by coating a synthetic plastic sheet with alloy powder (hereinafter referred to as an alloy powder tape) and a magnetic tape made by depositing an alloy on a synthetic plastic sheet by the evaporation process (hereinafter referred to as a deposited alloy tape). The curve 5a shows the reproducing frequency characteristics obtained by recording a recording current of a flat frequency characteristic on the alloy powder tape and reproducing it and the curve 5b shows the reproducing frequency characteristic of the deposited alloy tape. The reproducing frequency characteristic of the alloy powder tape exhibits a differential characteristic in a frequency band lower than 1 MHz and a low-pass filter characteristic in a frequency band higher than 2 MHz. The reproducing frequency characteristic of the deposited alloy tape produces higher outputs than those of the alloy powder tape in the frequency band higher than 2 MHz and it produces lower outputs than those of the alloy powder tape in the frequency band lower than 1 MHz.

Where a plurality of magnetic tapes having different reproducing frequency characteristics are used, it is necessary to record each signal with a recording current that suite the characteristic of each magnetic tape. FIG. 4 is a block diagram showing a magnetic recording apparatus which meets this requirement. The video signal of a television signal is supplied to an input terminal 15 and the video signal is supplied to an input circuit 45. The input circuit 45 includes a low-pass filter and a band-pass filter and the low-pass filter separates the luminance signal from the video signal supplies it to a luminance signal processing circuit 46. The band-pass filter separates the chrominance signal from the video signal and supplies it to a chrominance signal processing circuit 51. The luminance signal processing circuit 46 includes a frequency modulator so that the carrier signal is frequency modulated with the luminance signal to produce an FM luminance signal. The FM luminance signal produced by the luminance signal processing circuit 46 is supplied to a level changer 47 and the signal level of the FM luminance signal is changed in accordance with the frequency characteristic of the magnetic tape used. The gain of the level changer 47 is controlled by a control signal applied from a tape detector 48 thereby changing the signal level of the FM luminace signal. The tape detector 48 detects.the kind of the magnetic tape used and this is effected to determine for example whether the magnetic tape used is an alloy powder tape or a deposited alloy tape in accordance with a tape kind indicative code indicated on the case containing the magnetic tape or the presence or absence of a hole formed in the casset case. Of course, the kind of the magnetic tape may be instructed by a manual operation. After the signal level has been set by the level changer 47, the FM luminance signal is supplied to a first level adjuster 20 so that its signal level is adjusted again and supplied to an output amplifier 24.

Figure 5:
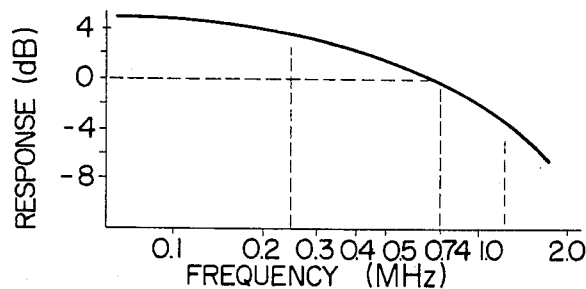
FIG. 5 is a frequency characteristic diagram of an equalizer.
Figure 6:
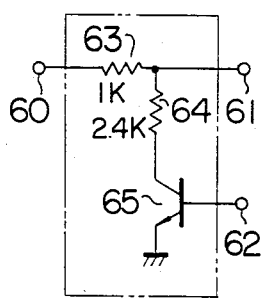
FIGS. 6, 7, 8 and 9 are specific circuit diagrams of a first level changer according to the invention.

The chrominance signal processing circuit 51 includes a frequency converter and it receives the chrominance signal separated by the input circuit 45 thereby converting the frequency of the color subcarrier signal of the chrominance signal to a lower frequency. The chrominance signal converted to the lower frequency by the chrominance signal processing circuit 51 is supplied to an equalizer circuit 53. FIG. 5 shows the frequency characteristic of the equalizer circuit 53 such that its gain is decreased in response to a frequency higher than the frequency-converted color subcarrier frequency of 743 kHz and the gain is increased in response to a frequency lower than the color subcarrier frequency. When the chrominance signal is supplied to the equalizer circuit 53 having the frequency characteristic shown in FIG. 5, the amplitudes of its side bands are changed in accordance with the frequency characteristic of the equalizer circuit 53 so that the lower side band is emphasized and the upper side band is slightly suppressed as shown in FIG. 1. This equalizer circuit 53 may be comprised of a low-pass filter having a time constant of 0.3 μs. The chrominance signal passed through the equalizer circuit 53 is supplied to a mixer 28.

The audio signal supplied to an input terminal 17 is supplied to an audio signal processing circuit 49. The audio signal processing circuit 49 includes a frequency modulator and the carrier signal is modulated with the audio signal supplied from the input terminal 17 producing an FM audio signal. The FM audio signal is changed to a level corresponding to the kind of the magnetic tape by the level changer 52 and then supplied to the mixer 28. A pilot signal processing circuit 50 includes an oscillator for generating four pilot signals of different frequencies sequentially at the rate of one per field and the pilot signal is supplied to the mixer 28 through the level changer 52. The mixer 28 combines and frequency multiplexes the chrominance signal, the FM audio signal and the pilot signal supplied thereto and supplies them to a second level adjuster 31. The second level adjuster 31 adjusts the signal level of the composite signal supplied from the mixer 28 and supplies it to the output amplifier 24. Two rotary transformers 55a and 55b are cornected to the output terminal of the output amplifier 24 so that the FM luminance signal, the chrominance signal, the FM audio signal and the pilot signal combined by the output amplifier 24 are supplied to two video heads 56a and 56b. The video heads 56a and 56b record these signals on the video track of a magnetic tape 54.

Since the magnetic recording apparatus shown in FIG. 4 changes the signal levels of the FM luminance signal and the FM audio signal and the pilot signals by the first and second level changers 47 and 52, respectively, in accordance with the kind of the magnetic tape 54, it is possible to record the signals with the optimum recording signal levels suited to the frequency characteristic of the magnetic tape used. However, the chrominance signal undergoes no level changing and it is supplied to the mixer 28. The reason is that the recording signal level of the chrominance signal to be recorded on the alloy powder tape and the deposited alloy tape shown in FIG. 3 is −13 dB or −14 dB at its maximum with respect to the signal level of the FM luminance signal and the chrominance signal needs not be changed in signal level in accordance with the kind of the magnetic tape.

The level adjusters 20 and 31 adjust the amplitudes of the signals to be supplied to the video heads 56a and 56b such that the signal levels of the signals become the optimum recording signal levels. Once the adjustments have been made, the level changers 47 and 52 change the signal levels to the optimum recording levels in accordance with the kind of a magnetic tape used.

Figure 7:
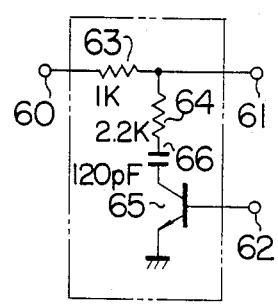
Figure 8:
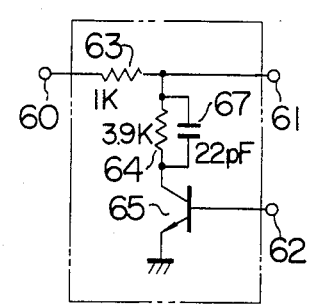
Figure 9:
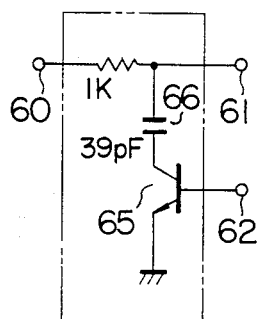

FIGS. 6, 7, 8 and 9 show specific circuit diagrams of the level changer 47 in which the FM luminance signal is supplied to an input terminal 60 from the luminance signal processing circuit 46 and an output terminal 61 is connected to the input terminal of the level adjuster 20. A control terminal 62 is connected to the output terminal of the tape detector 48. In the circuit shown in FIG. 6, a resistor 63 is connected between the input terminal 60 and the output terminal 61 and a resistor 64 connected between the output terminal 61 and the ground is grounded through the collector-emitter path of a switching transistor 65. In the circuit shown in FIG. 7 a capacitor 66 is connected in series with the resistor 64, and in the circuit shown in FIG. 8 the capacitor 66 is connected in parallel with the resistor 64. Also, in the circuit shown in FIG. 9 the capacitor 66 is connected between the collector of the transistor 65 and the output terminal 61 in place of the resistor 64. With the alloy powder tape and the deposited alloy tape of the characteristics shown in FIG. 3, the signal levels of the FM luminance signal, the FM audio signal and the pilot signals recorded on the deposited alloy tape are each lower by about 3 dB than that used for recording on the alloy powder tape. In the circuts shown in FIGS. 6 to 9, a positive voltage is supplied to the control terminal 62 from the tape detector 48 when the deposited alloy tape is used and a negative voltage is applied when the alloy powder tape is used. When the positive voltage is supplied to the control terminal 62, the transistor 65 is turned on so that the resistor 64 or the capacitor 66 is grounded and the FM luminance signal is attenuated through the resistors 63 and 64 or the resistor 63 and the capacitor 66 thereby delivering the FM luminance signal having a reduced amplitude to the output terminal 61. The circuit shown in FIG. 6 changes the level of the FM luminance signal over its entire band, and the circuits of FIGS. 7, 8 and 9 are designed so that the levels of the FM luminance signal which are around the carrier and the level of the upper side band are attenuated and the level of the lower side band is not changed as such.

Figure 10:
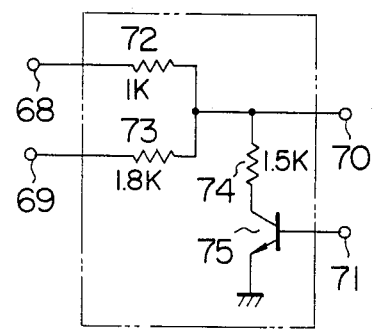
FIG. 10 is a specific circuit diagram of a second level changer according to the invention.

FIG. 10 is a specific circuit diagram of the second level changer 52 in which the FM audio signal is supplied from the audio signal processing circuit 49 to an input terminal 68 and the pilot signal is supplied from the pilot signal processing circuit 50 to an input terminal 69. An output terminal 70 is connected to the input terminal of the mixer 28, and a control terminal 71 is connected to the output terminal of the tape detector 48. Where the deposited alloy tape is used, a transistor 75 is turned on so that the FM audio signal and the pilot signal are attenuated through resistors 72 and 73, respectively, and the FM audio signal and the pilot signal reduced in amplitude are delivered to the output terminal 70.

Figure 11:
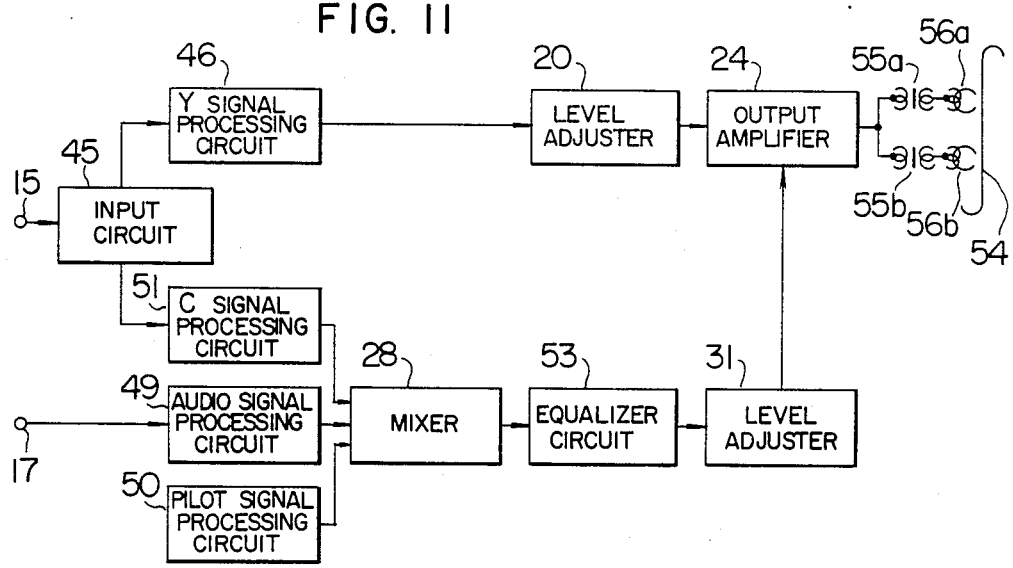
FIGS. 11, 12 and 13 are block diagrams showing another embodiments of the magnetic recording apparatus according to the invention.

FIG. 11 is a block diagram showing another embodiment of the magnetic recording apparatus of the invention. This embodiment differs from the embodiment of FIG. 4 in that the level changing and tape detection are not used and the equalization circuit 53 is arranged on the output side of the mixer 28 to serve as the common equalizer for the chrominance signal, the FM audio signal and the pilot signals. In this case, it is reasonable to suit the characteristic of the equalizer circuit 53 to the chrominance signal. Because it is the chrominance signal that requires the equalization most.

The bandwidth of the FM audio signal is exceedingly narrow and it is not affected by the equalizer circuit 53. However, the output signal of the audio signal processing circuit 49 includes spurious components such as represented by the seccnd harmonic distortion of the FM carrier. By passing the output signal through the equalizer circuit 53, it is possible to suppress these spurious components. The pilot signals also include the higher harmonic distortions and the equalizer circuit 53 can be used to suppress these distortions. The apparatus of this embodiment only requires the adjustments of the first level adjuster 20 for adjusting the signal level of the FM luminance signal and the second level adjuster 31 for adjusting the signal level of the chrominance signal, the FM audio signal and the pilot signals and the adjusting operation is simplified.

Figure 12:
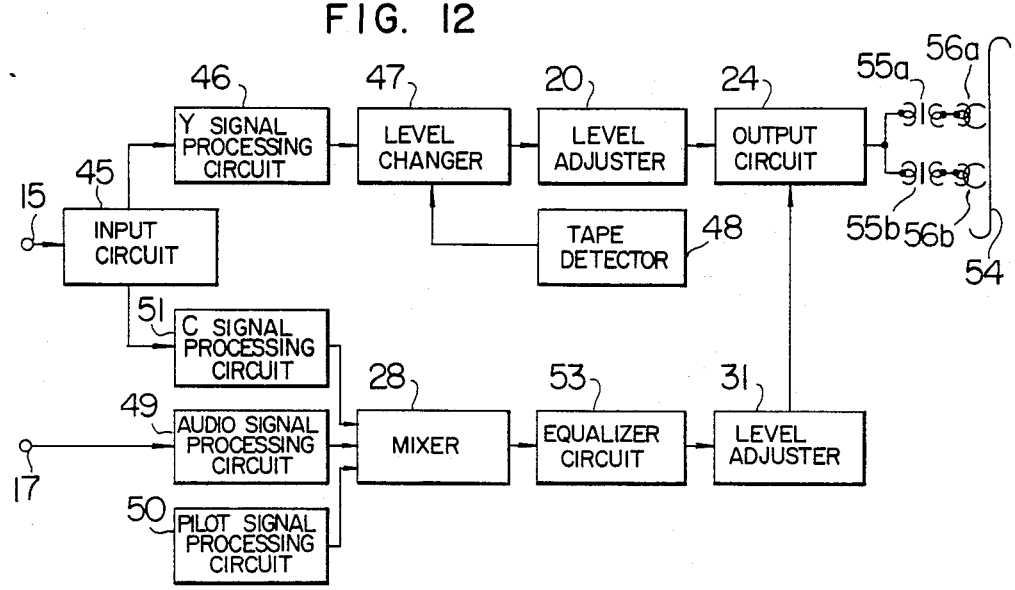

The embodiment of FIG. 12 differs from the embodiment of FIG. 11 in that only the signal level of the FM luminance signal is changed by the level changer 47 in accordance with the kind of the magnetic tape used and the signal levels of the chrominance signal, the FM audio signal and the pilot signals are not changed.

Figure 13:
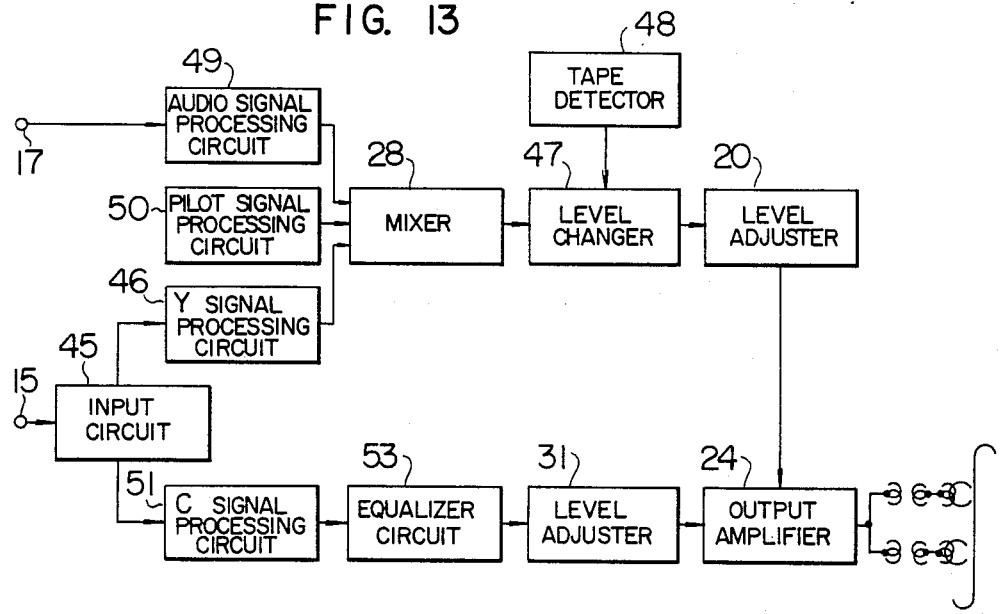

FIG. 13 is a block diagram showing another embodiment of the magnetic recording apparatus of this invention. The embodiment of FIG. 13 differs from the embodiment of FIG. 4 in that the FM luminance signal, the FM audio signal and the pilot signal are combined by the mixer 28 and then their signal levels are changed in accordance with the kind of the magnetic tape. In this way, the recording conditions for the deposited alloy tape can be adjusted to substantially the optimum values. However, there still remains the previously mentioned problem of accommodating the variations in characteristics among different video heads.

Figure 14:
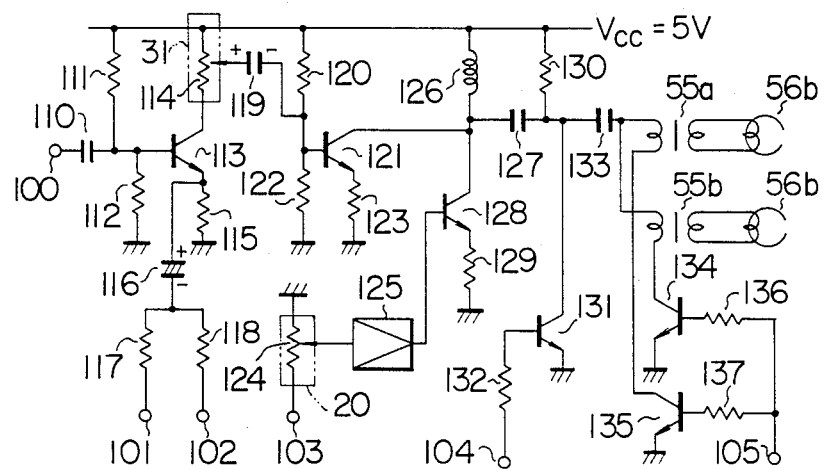
FIG. 14 is a specific circuit diagram of the level adjusters, mixcer and output amplifier according to the invention.

FIG. 14 is a specific circuit diagram of the level adjusters, the mixer and the output amplifier. The chrominance signal is supplied to a first input terminal 100 and the chrominance signal is applied to the base of a mixing transistor 113 through a capacitor 110. The pilot signal is supplied to a second input terminal 101 and the pilot signal is then supplied to the emitter of the transistor 113 through a resistor 117 and a capacitor 116. The FM audio signal is supplied to a third input terminal 102 and the FM audio signal is then supplied to the emitter of the transistor 113 through a resistor 118 and the capacitor 116. The transistor 113 mixes the chrominance signal and the FM audio signal and the pilot signal supplied to its base and emitter, respectively, and delivers an output signal to a load resistor 114. The load resistor 114 includes a variable resistor forming the second level adjuster 31 so that the composite signal resulting from the frequency multiplexing of the chrominance signal, the FM audio signal and the pilot signal is generated from its variable terminal and supplies it to the base of a first output transistor 121 through a capacitor 119. The FM luminance signal is supplied to a fourth input terminal 103 and the FM luminance signal is then supplied through a variable resistor 124 forming the first level adjuster 20 to an amplifier 125 which in turn amplifies and supplies it to the base of a second output transistor 128. The first and second output transistors 121 and 128 have a common collector load 126 so that the amplified FM luminance signal and the composite signal are combined and frequency multiplexed. The resulting output signal is then supplied through a series combination of capacitors 127 and 133 to the first and second rotary transformers 56a and 56b, respectively. A first control terminal 104 receives a negative voltage for recording and a positive voltage for playback and a transistor 131 is turned on only during the playback period thereby bypassing the outputs of the output transistors 121 and 128. A second control terminal 105 receives a positive voltage for recording and a negative voltage for playback. During the recording period, two switching transistors 134 and 135 are turned on in response to the control voltage so that the primary windings of the rotary transformers 55a and 55b are grounded at one end thereof and the recording currents flow to the rotary transformers 55a and 55b. During the playback period, the transistors 134 and 135 are turned off and thus no recording current flows to the rotary transistors 55a and 55b.

With the circuit described above, the video heads 56a and 56b are each supplied with the FM luminance signal and the composite signal through the rotary transformers 55a and 55b, respectively. The signal level of the luminance signal is adjusted by the variable resistor 124 and the composite signal is adjusted by the variable resistor 114 thereby adjusting their signal levels to suit the characteristic of the video heads 56a and 56b. By simply adjusting the two variable resistors 114 and 124, it is possible to change the signal levels of the signals supplied to the input terminals 100, 101, 102 and 103, respectively.

We claim:

1. A magnetic recording apparatus for recording on a video track of a magnetic tape a composite signal produced by frequency multiplexing a frequency-modulated luminance signal component, a chrominance signal component, a frequency-modulated audio signal component and a pilot signal component, said apparatus comprising:
   first mixing means for receiving and mixing at least two of said signal components forming said composite signal and producing a mixed signal;
   first signal level adjusting means for receiving said mixed signal and adjusting the signal level thereof;
   second signal level adjusting means for receiving the remainder of the signal components of said composite signal and adjusting the signal level thereof;
   second mixing means for receiving and mixing an output signal from said first signal level adjusting means and an output signal from said second signal level adjusting means and thereby producing said composite signal; and
   video head means for receiving said composite signal from said second mixing means and recording the same on the video track of said magnetic tape.

2. A magnetic recording apparatus for frequency multiplexing a frequency-modulated luminance signal, a chrominance signal, a frequency-modulated audio signal and a pilot signal and recording the same on a video track of a magnetic tape, said apparatus comprising:
   first signal level adjusting means for receiving said frequency-modulated luminance signal and adjusting the signal level thereof;
   mixer means for receiving and combining said chrominance signal, said pilot signal and said frequency-modulated audio signal to produce a composite signal;
   second signal level adjusting means for receiving said composite signal and adjusting the signal level thereof;
   mixing means for receiving an output signal from said first signal level adjusting means and an output signal from said second signal level adjusting means and thereby combining said frequency-modulated luminance signal and said composite signal; and
   video head means for receiving an output signal from said mixing means and recording the same on said magnetic tape.

3. An apparatus according to claim 2, further comprising level changing means for changing the signal level of said frequency-modulated luminance signal in accordance with a frequency characteristic of said magnetic tape.

* * * * *